United States Patent
Colley et al.

[11] Patent Number: 5,597,238
[45] Date of Patent: Jan. 28, 1997

[54] MARKING ELEMENT

[75] Inventors: Terence Colley, Bewdley; Stephen Minter, Hayfield; John Carnie, Heaton Mersey, all of United Kingdom

[73] Assignee: Food Guardian Limited, Malvern, United Kingdom

[21] Appl. No.: 82,995

[22] Filed: Jun. 25, 1993

Related U.S. Application Data

[63] Continuation of PCT/GB91/01879 filed Oct. 28, 1991.
[51] Int. Cl.[6] .................................................. G01K 11/06
[52] U.S. Cl. ........................................... 374/106; 116/219
[58] Field of Search .................................. 116/207, 219; 374/102, 104, 105, 106

[56] References Cited

U.S. PATENT DOCUMENTS

| | | |
|---|---|---|
| 3,055,759 | 9/1962 | Busby et al. |
| 3,414,415 | 12/1968 | Broad, Jr. |
| 3,420,205 | 1/1969 | Morison . |
| 3,479,877 | 12/1969 | Allen et al. |
| 3,751,382 | 8/1973 | Ljungberg et al. |
| 3,958,528 | 5/1976 | Hill ........................................ 116/219 |
| 4,148,272 | 4/1979 | Wetzold . |
| 4,382,700 | 5/1983 | Youngren ................................ 374/102 |
| 4,647,224 | 3/1987 | Holm et al. |
| 4,753,188 | 6/1988 | Schmoegner ........................... 116/217 |

FOREIGN PATENT DOCUMENTS

| | | |
|---|---|---|
| 0092034 | 3/1982 | European Pat. Off. . |
| 2130926 | 6/1971 | Germany . |
| 1212859 | 11/1970 | United Kingdom ................... 374/106 |
| 2064768 | 12/1979 | United Kingdom . |
| 2151784 | 9/1984 | United Kingdom . |
| WO91/09287 | 6/1991 | WIPO . |

OTHER PUBLICATIONS

Derwent Abstract of DE2130926.
Derwent Abstract of EP0092034.

*Primary Examiner*—William A. Cuchlinski, Jr.
*Assistant Examiner*—Willie Morris Worth
*Attorney, Agent, or Firm*—Woodard, Emhardt, Naughton, Moriarty & McNett

[57] ABSTRACT

A marking element for indicating whether a pre-defined temperature condition has been maintained. The marking element comprises a first material capable of flowing above a predetermined temperature separated from a second absorbent material by a barrier layer. The first and second materials are such that when the barrier layer is punctured and the predetermined temperature is exceeded the first material flows along the second material to produce a detectable change.

13 Claims, 1 Drawing Sheet

Fig. 1A
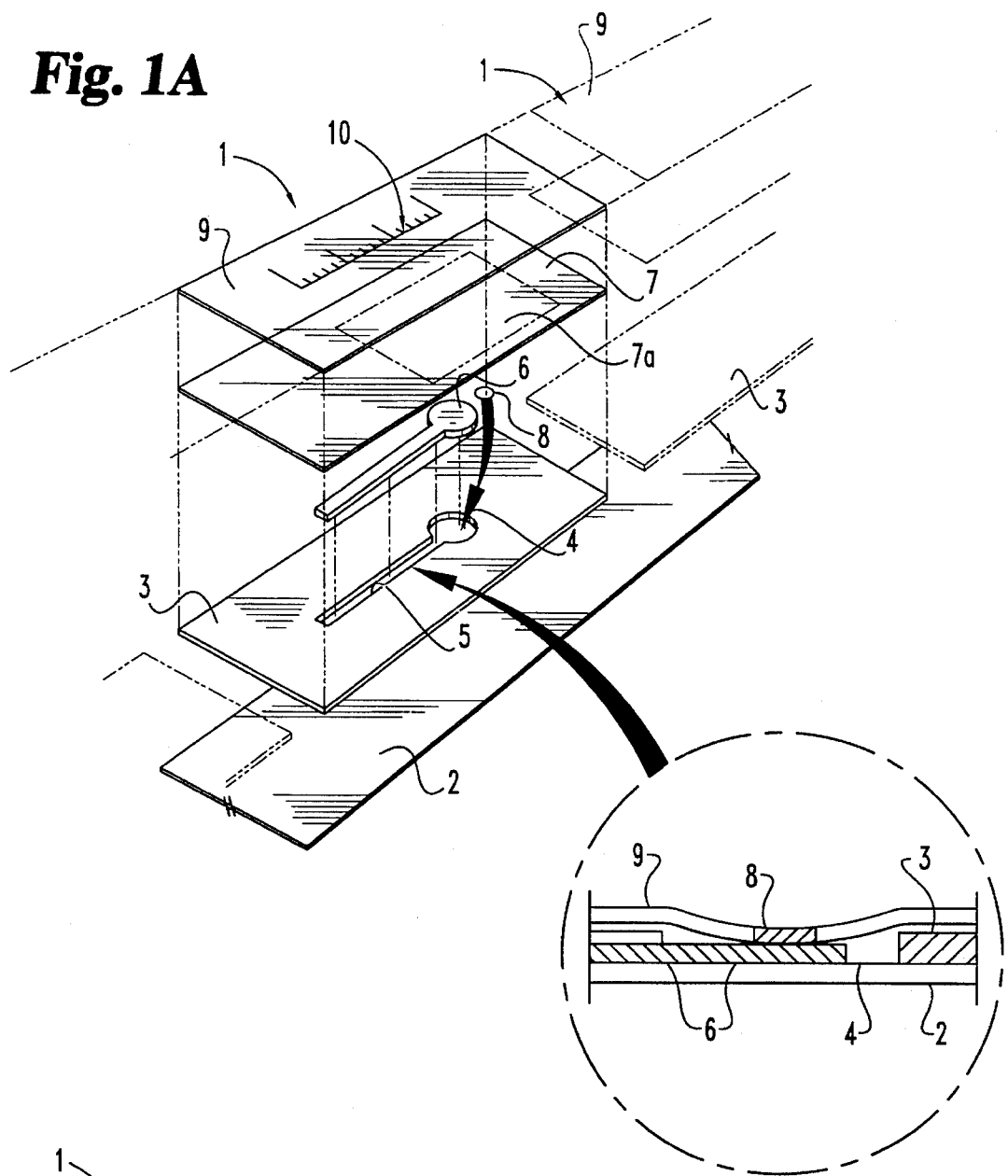
Fig. 1B
Fig. 2
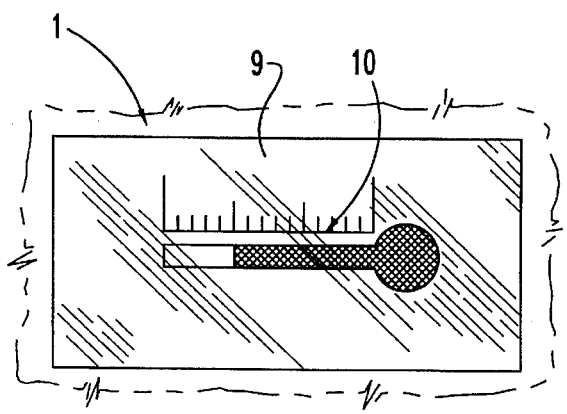

MARKING ELEMENT

REFERENCE TO RELATED APPLICATIONS

This is a continuation of International Application Serial No. PCT/GB91/01879 filed Oct. 28, 1991, which is hereby incorporated herein by reference in its entirety.

BACKGROUND OF THE INVENTION

The present invention relates to a marking element for use in conjunction with a product which is required to be maintained under a particular temperature or temperature-time condition.

There any many products which need to be stored under conditions such that a particular temperature limit is not exceeded, or at least is not exceeded for longer than a predetermined time. For convenience, both of these conditions are referred to generically herein as the predefined temperature condition. Generally, the temperature limit will be a maximum (rather than a minimum) temperature.

Particular examples are certain types of food product that have been pre-cooked or processed by freezing, irradiation, partial cooking, freeze drying or steaming (or other food processing procedures). If such products are not stored in accordance with the pre-defined temperature conditions then there is the danger of contamination by organisms which are injurious to human health. This danger is not removed by subsequently storing the product below the temperature maximum. Further examples of products which may need to be stored in accordance with pre-defined temperature conditions are certain pharmaceuticals which would otherwise deteriorate.

Currently, the purchasers of such susceptible products are not able to determine whether the product has been stored in contravention of the pre-defined conditions. For example, frozen food purchased in, say, a supermarket may be adequately frozen at the time of sale but the purchaser is unable to tell whether the food has previously been incorrectly stored. This has the potential health disadvantages mentioned above.

SUMMARY OF THE INVENTION

According to a first aspect of the present invention there is provided a marking element for indicating whether a pre-defined temperature condition has been maintained, comprising a first material capable of flowing above a predetermined temperature separated from a second absorbent material by a barrier layer (preferably impervious), the first and second materials being such that when the barrier layer is punctured and the predetermined temperature is exceeded the first material flows along the second material to produce a detectable change.

Preferably the marking element is constructed such that the first flowable material is provided adjacent one end of an elongate channel and (at that end of the channel) is separated by said barrier layer from the absorbent material which extends along the channel. Thus when the barrier layer has been punctured and the predetermined temperature has been exceeded the first material flows along the channel producing said detectable change. The extent to which the first material flows along the channel (and this extent of the detectable change along the channel) is an indication of the total time at which the marking element has been above the predetermined temperature.

A particularly suitable way of producing the marking element as described in the previous paragraph is to print a layer of an ink on to a carrier sheet such that the channel is formed in the ink. The absorbent material may be laid in position along the channel and then overlaid by a film providing the barrier layer. The first material may then be provided in the region of the barrier layer above the absorbent material and the whole then overlaid by a further film having a melting point higher than that of the barrier layer. In this way it is possible to use a probe heater to a temperature above the melting point of the barrier layer but below that of the outer film layer whereby the barrier layer is selectively punctured to "activate" the label.

Ideally the elongate channel is formed at one end with an enlarged "reservoir" region in which the first material is received.

Preferably the detectable change is a colour change so that any flow of the first material as a result of the predetermined temperature being exceeded is immediately visible.

The first material may comprise a polymeric material which reversibly fuses above a desired temperature, e.g. a thermo-reversible wax. It will of course be appreciated that the material to be used will be selected having regard to the desired temperature of fusion, and that for any one type of polymeric material it is possible to have a range of fusion temperatures depending on the molecular weight of the material. Inorganic salts (e.g. sodium or potassium chloride) can also be incorporated in the polymeric material for providing variation in temperature of fusion.

The absorbent material may for example be paper or a particulate material (e.g. kieselguhr).

The detectable change may be produced in a number of ways. For example, the first material may include a dye which (during flow of the first material) causes the absorbent material to become dyed and therefore coloured. Alternatively, the detectable change may be a colour change resulting from an irreversible chemical reaction. Thus the first and second materials may incorporate respective chemical reagents which when in contact react together to produce a colour change.

According to a second aspect of the present invention there is provided a marking element for indicating whether a pre-defined temperature condition has been maintained, the marking element comprising an elongate indicator track along which a detectable change (preferably a colour change) occurs when the marking element is above a pre-determined temperature, the length of the change being representative of the time for which the marking element is above said pre-determined temperature.

Preferably the marking element comprises a carrier layer on one face of which is laid a coating in which the indicator track is provided. To this end, the indicator track may include an absorbent material along which a colour is developed, as described for the first aspect of the invention. The reverse side of the carrier layer may be adhesively coated for fixing the marking element to a product for which the temperature storage conditions are to be monitored.

BRIEF DESCRIPTION OF THE DRAWINGS

The invention will be further described by way of example only with reference to the accompanying drawings, in which:

FIGS. 1A & 1B are exploded perspective view of one embodiment of label in accordance with the invention; and FIG. 2 shows the label after storage above the permitted temperature.

DESCRIPTION OF THE PREFERRED EMBODIMENT(S)

The construction of the label 1 will be described by reference to its method of production.

A carrier sheet 2 (which is adhesively coated on its reverse face) is printed with an ink layer 3 (e.g. a polymer based ink) which is such that a layer 3 of predetermined thickness is laid down. Layer 3 is shown as being generally rectangular but does include a circular aperture 4 adjacent to one end of a longitudinally extending rectangular channel 5. A plurality of rectangular ink layers 3 may be printed on to the carrier sheet 2. The layer 3 may, for example be white.

An absorbent paper wick 6 is then laid completely along the length of channel 5, the wick 6 being of sufficient length so as to extend over into the aperture 4 where the wick terminates (see inset to drawing). Instead of a paper wick it is possible to use a powder wick, e.g. of kieselguhr. Furthermore, although FIG. 1 shows the channel 5 opening into aperture 4, it is possible for there to be a barrier of the ink 3 between the end of channel 5 and the aperture 4. In such a case, the wick 6 may simply extend over the barrier.

In the next stage of manufacture, a clear layer 7 of a heat shrink film is laminated on to the ink layer 3. For convenience, the drawing shows layer 7 as being coterminous with layer 3 but in practice a single layer 7 may be provided to overlie all of the layers 3.

An amount of a temperature condition indicator material 8 is then introduced into aperture 4 and "sits" on the layer 7 above the wick 6. This material is one which is of a viscosity such that the material does not flow (at least to and substantial extent below a predetermined temperature, but will be capable of flowing along the wick 6 above this temperature. The predetermined temperature is the temperature above which a product (with which the finished label will be associated) should not be stored, or at least not stored above the temperature for more than a predetermined time.

The material 8 will generally be colored, e.g. by the incorporation of a dye therein. A red dye is particularly suitable for use in conjunction with a white layer 3.

In the final stage of manufacture, a further clear layer 9 is applied. This layer 9 may of course be a single layer overlying all of the layers 3.

Layer 9 is of a material which melts (or softens) only at a higher temperature than does layer 7. This latter layer may for example be one which melts or softens at 100° to 120° C. Furthermore, layer 9 may be printed with indicia, such as the scale 10 and other information e.g. company name (not shown).

In use, the label is attached to the packaging of a product whose storage temperature is to be monitored. The label is then activated by the application of a point source of heat. This can be achieved by using a flat pointed probe of 2–2.5 mm in diameter heated to at least 100° C. but no higher then 120° C. (a hand held soldering iron will suffice if it can be controlled to the desired temperature). The flat pointed probe is applied within the circular area of the label and should be held in position for 0.5–1 mseconds. As a result, layer 7 is punctured so that material 8 is able to come into contact with the wick 6.

Once activated, the label must be maintained below the specified storage temperature for the product.

If the temperature at which the product is stored rises above the predetermined temperature then the material 8 will become less viscous and will be capable of flowing along the wick 6. The material 8 will continue to flow along the wick for so long as the predetermined temperature is exceeded. This will result in the wick becoming indelibly coloured over a part of its length extending from its end adjacent aperture 4 (see FIG. 2). It will be appreciated that in the event of the product being stored above the permitted temperature and then returned to below the permitted temperature, the material 8 increases in viscosity to prevent movement along the wick 6 although the indelible colouring of the wick 6 is maintained. If the product should then once again be shored above the permitted temperature, the viscosity of material 8 will decrease and the material can advance further along the wick.

A measure of the length of time for which the temperature has been exceeded may be obtained by reference to the scale 10, the graduations of which may be representative of the number of minutes exposure above the predetermined time. It is obviously an easy matter to inspect the scale visually to obtain a representation of the total time that the product has been stored above the predetermined temperature. If this time is excessive then the product may be discarded.

It should be appreciated that the labels 1 may be used in a number of ways. For example, the label may be attached to the packaging of individual products so that a purchaser of the product (e.g. in a supermarket) can determine the time for which the product has been stored above the permitted temperature. Alternatively, a label may be attached to a carton in which the products are delivered to (say) a supermarket. In this case, the supermarket personnel are able to decide whether the product has been stored above the permitted temperature for too long.

The marking element according to the invention may also take a number of forms other than that illustrated in the accompanying drawings.

For example, the marking element may comprise a backing paper, a paper strip forming a wick which is positioned on the backing paper, a heat sensitive laminate applied over the backing paper and paper strip, a paper pad positioned over one end of the paper strip and containing the indicator material, and a final laminate to seal the system.

Furthermore, it is not essential that the marking element be used as an indicator of the time for which the product has been stored above a particular temperature. The marking element may be used, for example, merely to indicate that a particular storage temperature has been exceeded. For example, the marking element may comprise a circular paper pad (fixed to a support) overlaid by a heat-sensitive polymer layer between which an upper laminate layer is sandwiched to the indicator material. To use the marking element, the heat sensitive polymer layer is punctured as described above. If the marking element is subjected to a temperature above that at which the indicator material will flow, then this material flows into the paper pad and provides an indiction that a predetermined temperature has been exceeded.

We claim:

1. A marking element for indicating whether a pre-defined temperature condition has been maintained, comprising:

(a) a base layer;

(b) a film layer; and (c) an indicating layer;

said indicating layer being disposed between said base layer and said film layer; wherein said indicating layer comprises:

(i) a flowable material which flows when and only when at a temperature above a predetermined temperature;

(ii) an absorbent material which cooperates with said flowable material to produce a detectable change in an area of said absorbent material when said area is contacted by said flowable material; and (iii) a barrier material disposed between said flowable material and said absorbent material, said barrier material being effective to separate said flowable material from said absorbent material until the barrier material is breached, wherein said barrier material has a melting point lower than that of said film layer and is breachable by the application of a source of heat to said film layer.

2. A marking element as claimed in claim 1, wherein the barrier material is impervious to the flowable material.

3. A marking element as claimed in claim 1, wherein the flowable material is provided adjacent one end of an elongated channel in said indicating layer and at said one end of the elongated channel said flowable material is separated by said barrier material from the absorbent material which extends along the channel.

4. A marking element as claimed in claim 3, wherein the elongated channel is formed at said one end with an enlarged region to provide a reservoir in which the flowable material is received after said barrier material has been breached and said flowable material is at a temperature above said predetermined temperature.

5. A marking element as claimed in claim 1, wherein the detectable change is a visible colour change in said area of said absorbent material.

6. A marking element as claimed in claim 1, wherein the flowable material comprises a polymeric material which reversibly fuses above said predetermined temperature.

7. A marking element as claimed in claim 6, wherein the polymeric material is a thermo-reversible wax.

8. A marking element as claimed in claim 7, wherein the polymeric material incorporates an inorganic salt to provide a modification of its temperature of fusion.

9. A marking element as claimed in claim 1, wherein the absorbent material is paper.

10. A marking element as claimed in claim 1, wherein the absorbent material is a particulate material.

11. A marking element as claimed in claim 1, wherein the flowable material includes a dye which during flow of the flowable material produces the detectable change in the absorbent material.

12. A marking element as claimed in claim 1, wherein the detectable change is a colour change resulting from an irreversible chemical reaction between a first chemical reagent in said flowable material and a second chemical reagent in said absorbent material.

13. A method of producing a marking element comprising:

(i) printing a layer of ink onto a base layer carrier sheet such that a channel is formed in the ink, (ii) providing an absorbent material within the channel, (iii) overlying the absorbent material with a barrier layer, (iv) providing a flowable material above the barrier layer overlaying the absorbent material, said flowable material flowing when and only when at a temperature above a predetermined temperature, and said absorbent material cooperating with said flowable material to produce a detectable change in an area of said absorbent material when said area is contacted with said flowable material, and then (v) overlaying the whole with a film layer which has a melting point higher than the melting point of said barrier layer;

wherein said barrier layer is breachable by the application of a source of heat to said film layer; and wherein breaching said barrier layer and therafter said element to a temperature above said predetermined temperature causes said flowable material to cooperate with said absorbent material so as to produce the detectable change.

* * * * *

UNITED STATES PATENT AND TRADEMARK OFFICE
CERTIFICATE OF CORRECTION

PATENT NO. : 5,597,238
DATED : January 28, 1997
INVENTOR(S) : Terence Colley, Stephen Minter and John Carnie It is certified that error appears in the above-identified patent and that said Letters Patent is hereby corrected as shown below:

In col. 3, line 35, please delete "and" and insert in lieu thereof --any--.

In col. 3, line 36, please add --)-- after the word "extent".

Signed and Sealed this

Twenty-third Day of December, 1997

Attest:

BRUCE LEHMAN

Attesting Officer

Commissioner of Patents and Trademarks